United States Patent [19]

Sakoe et al.

[11] 4,158,750
[45] Jun. 19, 1979

[54] SPEECH RECOGNITION SYSTEM WITH DELAYED OUTPUT

[75] Inventors: Hiroaki Sakoe; Seibi Chiba, both of Tokyo, Japan

[73] Assignee: Nippon Electric Co., Ltd., Tokyo, Japan

[21] Appl. No.: 800,819

[22] Filed: May 26, 1977

[30] Foreign Application Priority Data

May 27, 1976 [JP] Japan .................................. 51-61984
Jun. 1, 1976 [JP] Japan .................................. 51-64197

[51] Int. Cl.² .............................................. G10L 1/00
[52] U.S. Cl. ................................................ 179/1 SD
[58] Field of Search ............... 179/1 SD, 1 SB, 1 SC, 179/1 VC

[56] References Cited

U.S. PATENT DOCUMENTS

| 3,553,372 | 1/1971 | Wright et al. | 179/1 SD |
| 4,032,710 | 6/1977 | Martin et al. | 179/1 SD |

OTHER PUBLICATIONS

G. Clapper, "Interlocks for Connected-Word Recognition System," IBM Tech. Discl. Bull., Aug. 1970.

Primary Examiner—Kathleen H. Claffy
Assistant Examiner—E. S. Kemeny
Attorney, Agent, or Firm—Sughrue, Rothwell, Mion, Zinn and Macpeak

[57] ABSTRACT

In a speech recognition system of the type including a recognition unit responsive to a voice input and a conditioning input for recognizing the voice input to produce a recognition output, a start signal is produced whenever a voice input exceeds a threshold level and a pause interval detection signal is produced whenever a voice input falls below a threshold level. An output timing signal is produced when the detection signal lasts a preselected interval of time that may be either about 250 milliseconds or about 250 milliseconds plus a delay. The recognition output from the recognition unit produced in response to the detection signal is displayed in response also to the detection signal. The result is delivered to a utilization device in response to the output timing signal. The delay may be given either by a predetermined duration or an interval between those instants at which the above-mentioned 250 milliseconds have just elapsed after production of the detection signal and after production of another pause interval detection signal for a next following voice input. During the delay, it is possible either by a manually operable switch or a cancel voice input to cancel delivery of the recognition result displayed to be incorrect.

8 Claims, 13 Drawing Figures

SPEECH RECOGNITION SYSTEM WITH DELAYED OUTPUT

BACKGROUND OF THE INVENTION

This invention relates to a speech recognition system.

A speech recognition system for automatically recognizing words spoken by human beings is believed to be very effective as a novel installation for supplying various data and commands as voice inputs from the human beings to electronic digital computers and other objective apparatus herein called either "controlled devices" or, as usual, utilization devices. For instance, a speech recognition system for recognizing spoken numerals is capable for supplying numerical data from slips or tickets and others to a controlled device connected thereto. This renders it possible to provide a novel and effective mode of operation of supplying input data to the controlled device from remote locations because speech signals are readily transmitted through inexpensive telephone channels. A speech recognition system for recognizing spoken commands necessary for control by an operator of various controlled devices enables the operator to control the devices only by voice and to use his hands and feet for other purposes, thereby enabling him to simultaneously carry out a plurality of jobs and to make full use of his capability.

A speech recognition system hitherto developed, however, is liable to operate incorrectly and get into misrecognition when ambient noises are present and/or when utterance or pronunciation of the voice inputs is ambiguous. It is therefore necessary in cases where errors in the inputs to a controlled device are strictly forbidden to provide a speech recognition system with facilities for displaying a result of recognition for confirmation by the operator as soon as a voice input comes to an end and ultimately decided by the system to be a certain sequence of vowels and consonants. With such facilities, the operator cyclically advances steps of utterance of voice inputs and confirmation of the recognition results and carries out the input operation by pronouncing successive voice inputs so long as no misrecognition is found during the confirmation step and by repeatedly pronouncing the same voice input in the presence of errors with supply to the controlled device of the incorrect recognition result suspended until it is confirmed that the misrecognition has been corrected.

In order to proceed with the input operation with such a speech recognition system at a high speed, it is indispensable in the first place to make the speech recognition system rapidly display the result of recognition for confirmation by the operator. The problem here is that several hundreds of milliseconds are necessary after actual termination of utterance for the system to decide the result of recognition. More particularly, termination of utterance is detected in almost all speech recognition system available at present by watching amplitude levels of the voice inputs. It is thereby inappropriate to determine in haste that instant to be an end of the voice input of a word at which the amplitude level falls instantaneously to zero (or, in practice, to a sufficiently low level). Determination of the end is possible for the first time when the amplitude level is left at zero for a predetermined period of time, such as 250 milliseconds.

Let the utterance be for a numeral "6" (/roku/ in Japanese). A break or pause in a sense is interposed between /ro/ and /ku/ at which the amplitude level falls to zero (such a pause being hereafter called a "pause interval in a word"). If an instant at which the amplitude level falls to zero were decided to be an end of utterance of a word, then /ro/ would be understood to be a complete word and be possibly misrecognized as another numeral "5" (/go/ in Japanese). It is therefore mandatory for avoidance of such troubles to correctly judge whether an interal in which the amplitude level is left at zero is a pause interval in a word of a true end of a word, namely, an "end interval" either following a word or between two consecutive words. A pause interval in a word is usually shorter than about 200 milliseconds. From this fact, it is possible to conclude that a zero amplitude level interval equal to or shorter than a predetermined period of about 250 milliseconds and that longer than the predetermined period of time are a pause interval in a word and an end interval of a word, respectively. As an eventual result, it has been infeasible to display the recognition result before a lapse of the predetermined period of time after termination of utterance.

In view of the facts described hereinabove, it has been impossible with a conventional speech recognition system for an operator to know the result of recognition before a lapse in vain of several hundreds of milliseconds after termination of utterance and to pronounce a next following voice input until the recognition result is displayed and confirmed to be correct. A conventional speech recognition system has therefore been incapable of supplying inputs by voice to controlled devices at a high speed.

In order to smoothly carry out with a speech recognition system of the type described the steps of utterance of voice inputs, confirmation of the results of recognition, and correction, if necessary, of incorrect results of recognition, it is indispensible in the second place that the correction should be accomplished before the incorrect recognition result is undesiredly supplied to a controlled device. If the recognition result were supplied to the device no later than the result is displayed, confirmation and correction are next to impossible. It is therefore desirable to provide a sufficient interval of time for the confirmation and correction and yet to keep the high speed of the input operation.

SUMMARY OF THE INVENTION

It is therefore an object of the present invention to provide a speech recognition system capable of supplying inputs by voice to a controlled device at a high speed.

It is another object of this invention to provide a speech recognition system of the type described, which is capable of displaying results of recognition at a soonest possible instant after termination of utterance of a word.

It is still another object of this invention to provide a speech recognition system of the type described, which is capable of providing a sufficient interval of time for confirmation of the displayed result and correction, if any, of misrecognition and yet supplying the voice inputs to the controlled device at a high speed.

As is already known in the art, a speech recognition system includes recognition means responsive to a voice input and a conditioning input, such as known start and end signals, for recognizing the voice input to produce a recognition output representative of a result of recognition. In accordance with this invention, the recognition system comprises beginning detection means responsive to the voice input for producing a start pulse representative of the beginning of the voice input, pause interval detection means responsive to the voice input and a predetermined threshold level for producing a pause interval detection signal whenever the voice input falls below supplying the threshold level, means for supplying the start pulse and the pause interval detection signal to the recognition means as the conditioning input, display means responsive to the pause interval detection signal and the recognition output for displaying the result of recognition, output control means responsive to the pause interval detection signal for producing an output timing signal only when the pause interval detection signal lasts at least a preselected interval of time, such as either a predetermined period of the order of 250 milliseconds or the predetermined period of time plus a delay, and output means responsive to the output timing signal for supplying the recognition output to a utilization device.

DESCRIPTION OF THE PREFERRED EMBODIMENTS

Figure 1:
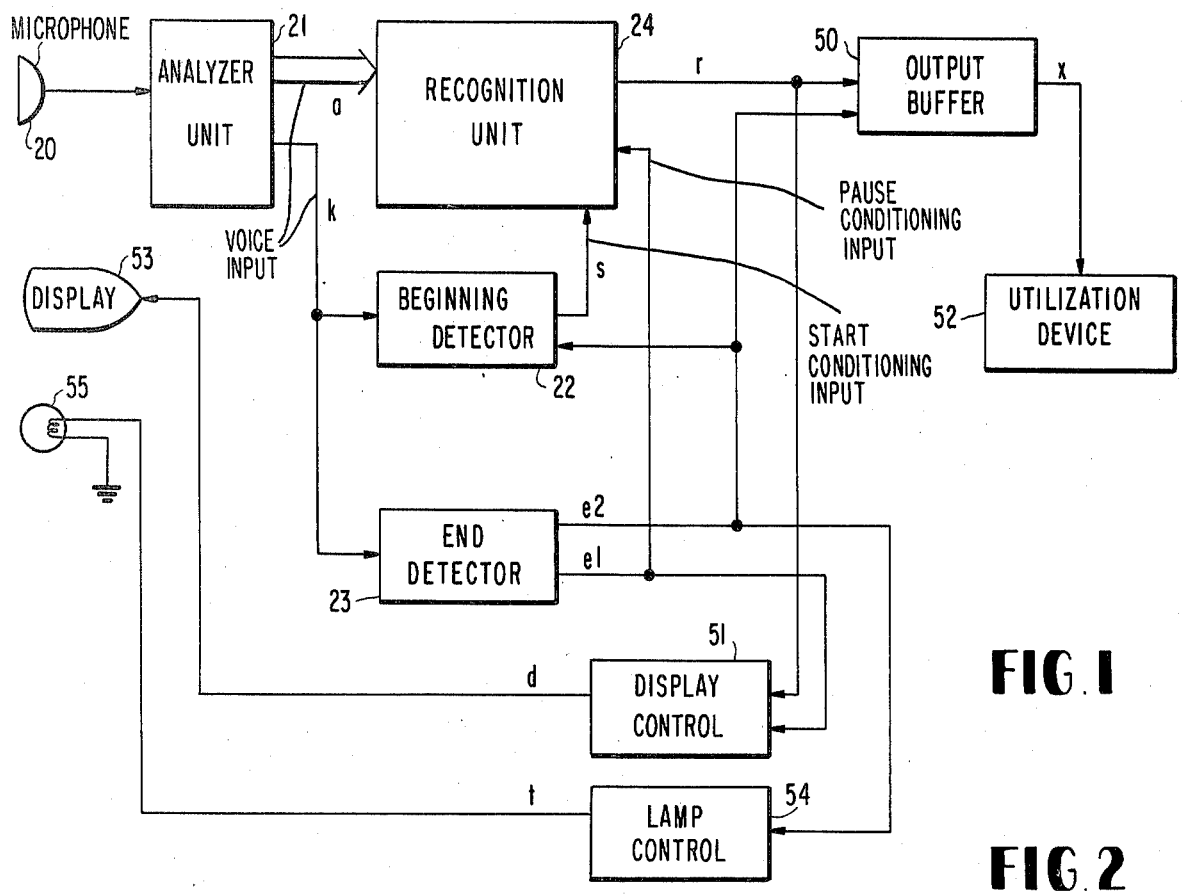
FIG. 1 is a block diagram of a speech recognition system according to a first embodiment of the present invention.
Figure 2:
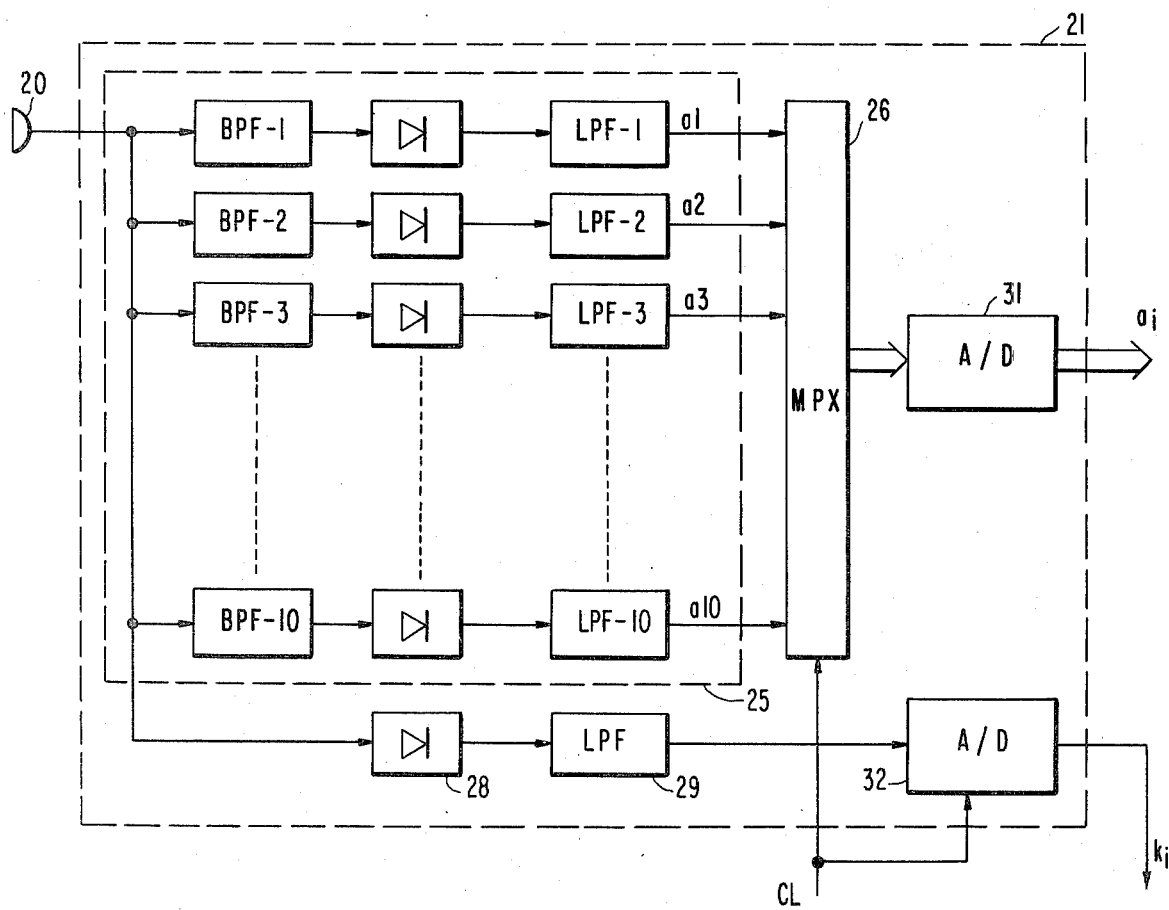
FIG. 2 is a block diagram of an analyser unit used in a speech recognition system according to this invention.

Referring to FIGS. 1 and 2, a speech recognition system according to a first embodiment of the present invention comprises a microphone 20 for converting an input voice pattern given thereto as a voice input into an electric signal, an analyser unit 21 for analysing the electric signal into an amplitude level k thereof and a recognition parameter $\alpha$, a beginning detector 22 responsive in effect to the amplitude level k for deciding a beginning or a start point of the input voice pattern, an end detector 23 responsive also in effect to the amplitude level k for deciding a pause interval in general and an end, namely, a beginning of an end interval of the pattern, and a recognition unit 24 responsive in effect to the parameter $\alpha$ for recognizing the voice input, namely, the input voice pattern. The analyser unit 21 is a circuit for extracting from the input voice pattern the parameter $\alpha$ necessary for recognition of the pattern and may comprise a band-pass filter analyser, an autocorrelation analyser, a linear predictive analyser, or the like. An analyser unit 21 exemplified in FIG. 2 comprises a known band-pass filter analyser circuit 25 comprising, in turn, band-pass filters BPF-1/10, rectifiers, and low-pass filters LPF-1/10 of, for example, from a first to a tenth channel for analysing the electric signal into ten analog signals $a_1$, $a_2$, $a_3$, ..., and $a_{10}$ of different frequency bands.

Figure 3:
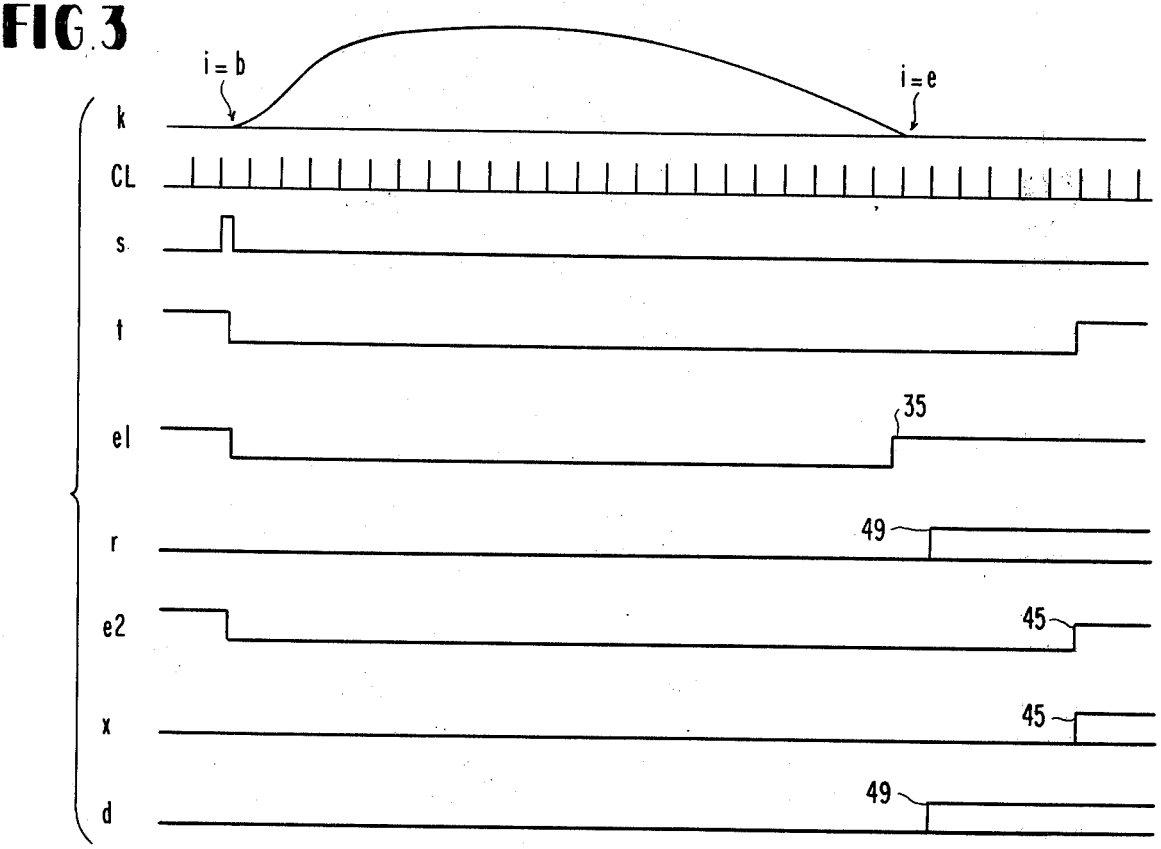
FIG. 3 is a time chart of several signals used in the speech recognition system shown in FIG. 1.

Referring again to FIG. 2 and afresh to FIG. 3, the exemplified analyser unit 21 further comprises an analog multiplexer 26 responsive to the analog signals $a_1$–$a_{10}$ and a sequence of known frame synchronizing or frequency pulses CL defining successive sampling instants i (i being representative of integers) for producing a time division multiplexed signal. By way of example, the pulses CL have a repetition period of ten milliseconds. The analyser unit 21 still further comprises a single rectifier 28 for rectifying the electric signal into a rectified signal, a single low-pass filter 29 for smoothing the rectified signal into a smoothed signal, a first analog-to-digital converter 31 for converting the time division multiplexed signal into a digital signal representative of the recognition parameter $\alpha$, and a second analog-to-digital converter 32 responsive to the frame frequency pulses CL for converting the smoothed signal into another digital signal representative of the amplitude level k. The recognition parameter $\alpha$ is therefore given by a time sequence of those input vectors $\alpha_i$ as termed in the art, each of which is defined by:

$$\alpha_i = (a_{1i}, a_{2i}, \ldots, a_{xi}, \ldots, a_{10i}), \tag{1}$$

where $a_{xi}$ (x being representative of one of integers 1 through 10 for the illustrated analyser circuit 25) represents an x-th channel output signal of the analyser circuit 25 as digitallized at an i-th sampling instant. Likewise, the amplitude level k is given by another time sequence of digital amplitude levels $k_i$.

Further referring to FIGS. 1 and 3, the beginning detector 22 detects the beginning of the input voice pattern to supply a start pulse s to the recognition unit 24. For simplicity, the beginning detector 22 may be a comparator for successively comparing the digital amplitude levels $k_i$ with a first predetermined threshold level $\theta_b$ to produce the start pulse s when the amplitude levels $k_i$ grow higher than the threshold level $\theta_b$ for the first time. A sampling instant i at which the start pulse s is produced is designated by b.

Figure 4:
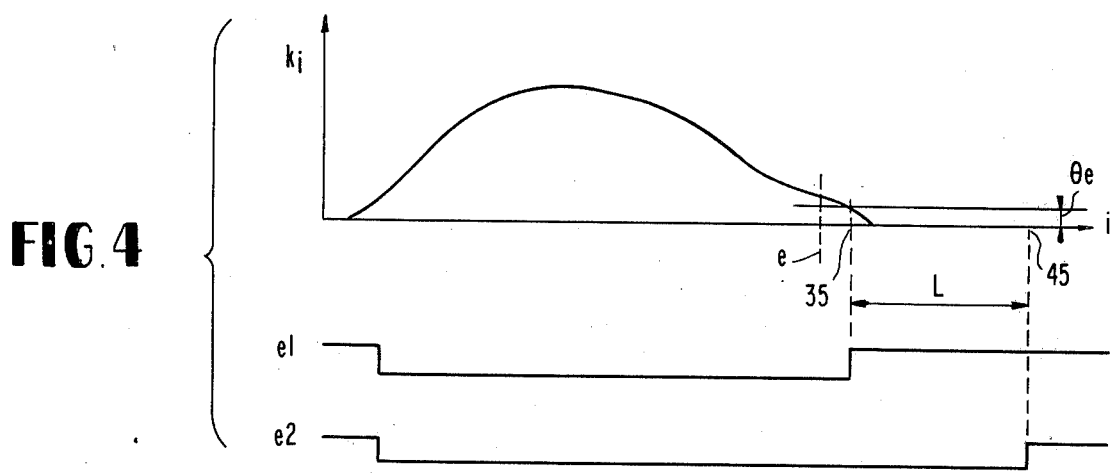
FIG. 4 is a detailed time chart of a few of the signals illustrated in FIG. 3.

Referring to FIG. 3 again and to FIG. 4 anew, a pause interval begins at an instant 35 at which the digital amplitude levels $k_i$ fall below a second predetermined threshold level $\theta_e$. A pause interval longer than a predetermined period of time L, such as twenty-five in terms of the ten-millisecond repetition period of the frame frequency pulses CL, is an end interval mentioned in the preamble of the instant specification. An end of the input voice pattern is now defined by a sampling instant e next preceding the beginning, namely, the above-mentioned instant 35 of the end interval. The first and second predetermined threshold levels $\theta_b$ and $\theta_e$ may be equal to each other.

Figure 5:
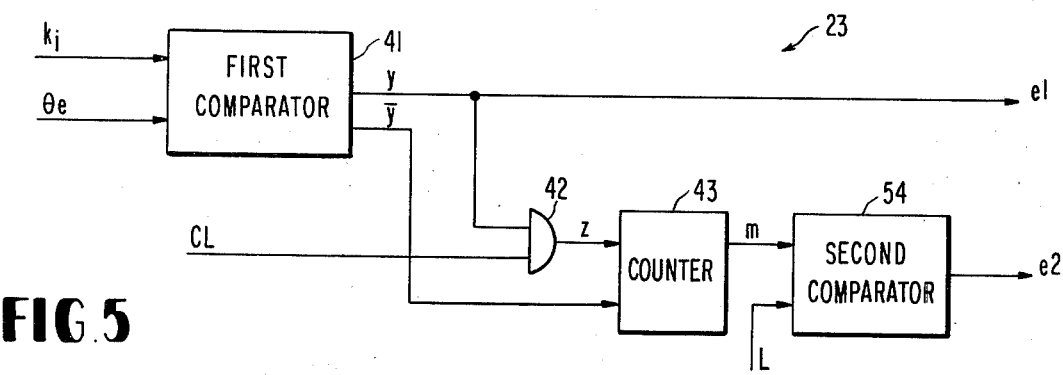
FIG. 5 is a block diagram of an end detector used in a speech recognition system according to the first embodiment.

Referring to FIGS. 3 and 4 again and to FIG. 5 anew, the end detector 23 comprises a first comparator 41 for successively comparing the digital amplitude levels $k_i$ with the second predetermined threshold level $\theta_e$ to produce an uninverted comparison output y and an inverted comparison output $\bar{y}$ which become logic 0 and 1, respectively, when the amplitude levels $k_i$ are equal to or higher than the threshold level $\theta_e$ and logic 1 and 0, respectively, when the former levels $k_i$ are lower than the latter level $\theta_e$. The uninverted comparison output y serves as a pause interval detection signal e1, which takes the logic 1 and 0 values according as the digital amplitude levels $k_i$ are lower and not lower, respectively, than the threshold level $\theta_e$. The detector 23 further comprises an AND gate 42 enabled by the logic 1 uninverted comparison output y to cause the frame frequency pulses CL to pass therethrough as pause duration pulses z, a counter 43 reset by the inverted comparison output $\bar{y}$ and adapted to count, while not reset, the pause duration pulses z and provide a pause duration count m representative of a lapse of the pause interval, and a second comparator 44 for comparing the count m with the predetermined period of time L to produce an end detection signal e2 that is kept at logic 0 while the amplitude levels $k_i$ are not lower than the threshold level $\theta_e$ and so long as a lapse of the pause interval is shorter than the predetermined period L and that is rendered logic 1 from that instant 45 forward at which the lapse of the pause interval reaches the predetermined period L until digital amplitude levels $k_i$ derived from a next following input voice pattern grow to reach the threshold level $\theta_e$. It is possible to say that a leading edge 45 of the end detection signal e2 represents the end e of an input voice pattern with a delay of the predetermined period L plus a fraction of the repetition period of the frame frequency pulses CL.

Turning back to FIG. 1, the recognition unit 24 successively receives the input vectors $a_i$ given by Equation (1) in synchronism with the frame frequency pulses CL, starting at a sampling instant b at which a start pulse s is supplied thereto, and prepares for recognition of the input voice pattern. Responsive to a pause interval detection signal e1 which is rendered logic 1 a fraction of the repetition period of the pulses CL after another sampling instant e, the recognition unit 24 begins the recognition operation by the use of an input pattern A as known in the art, regarding the logic 1 pause interval detection signal e1 to be representative of the end of the input voice pattern. The input pattern A is given by:

$$A = a_b, a_{b+1}, \ldots, a_i, \ldots, a_e \qquad (2)$$

under the circumstances. The recognition unit 24 may be any one of known recognition units, such as that disclosed in the specification of U.S. Pat. No. 3,816,722 issued to Sakoe and Chiba, the instant joint applicants and assignors to the present assignee, with reference to FIG. 11 thereof. Thus, the recognition unit 24 holds reference patterns $B^n$ defined by the use of reference vectors $\beta_j^n$, $J^n$ in number, as:

$$B^n = \beta_1^n, \beta_2^n, \ldots, \beta_j^n, \ldots, \beta_{J^n}^n$$

for a plurality of words n, N in number, preselected for various possible input voice patterns. As soon as the pause interval detection signal e1 turns to the logic 1 value, the recognition unit 24 carries out, in any known manner, pattern matching between the input pattern A and individual ones of the reference patterns $B^n$ resorting to dynamic programming to calculate similarity measures $S(A, B^n)$ between the input pattern A and the respective reference patterns $B^n$ and eventually to decide as a result of recognition a specific word r among the preselected words n that provides a maximum similarity measure $S(A, B^r)$. A start pulse s and a logic 1 pause interval detection signal e1 thus serve as a conditioning input for putting the recognition unit 24 into operation.

Referring to FIGS. 1 and 3 once again, the recognition unit 24 provides the result of recognition r at an instant 49, a short time after turning to the logic 1 value of the pause interval detection signal e1. The recognition result r is supplied to an output buffer 50 that serves as an output unit and to a display control unit 51 that may also be a buffer register. The output buffer 50 supplies the recognition result r as a recognition output x, namely, as an output signal of the recognition system, to a controlled or utilization device 52 only when the end detection signal e2 supplied thereto as an output timing signal takes the logic 1 value. The display control unit 51 transmits the recognition result r as a display signal d to a display unit 53 only while the pause interval detection signal e1 supplied thereto is kept at the logic 1 value. The display unit 53 may be any one of known display panels or tubes, such as a character display comprising light-emitting diodes, for giving a visual display of the specific word r in response to the display signal d. The end detection signal e2 is supplied also to a lamp control unit 54, which may be a relay or a switch for supplying an energizing electric current t to a lamp 55 only while the signal e2 takes the logic 1 value. It is now understood that the end detector 23 except the first comparator 41 serves as an output control unit for producing an output timing signal in response to a pause interval detection signal.

Figure 6:
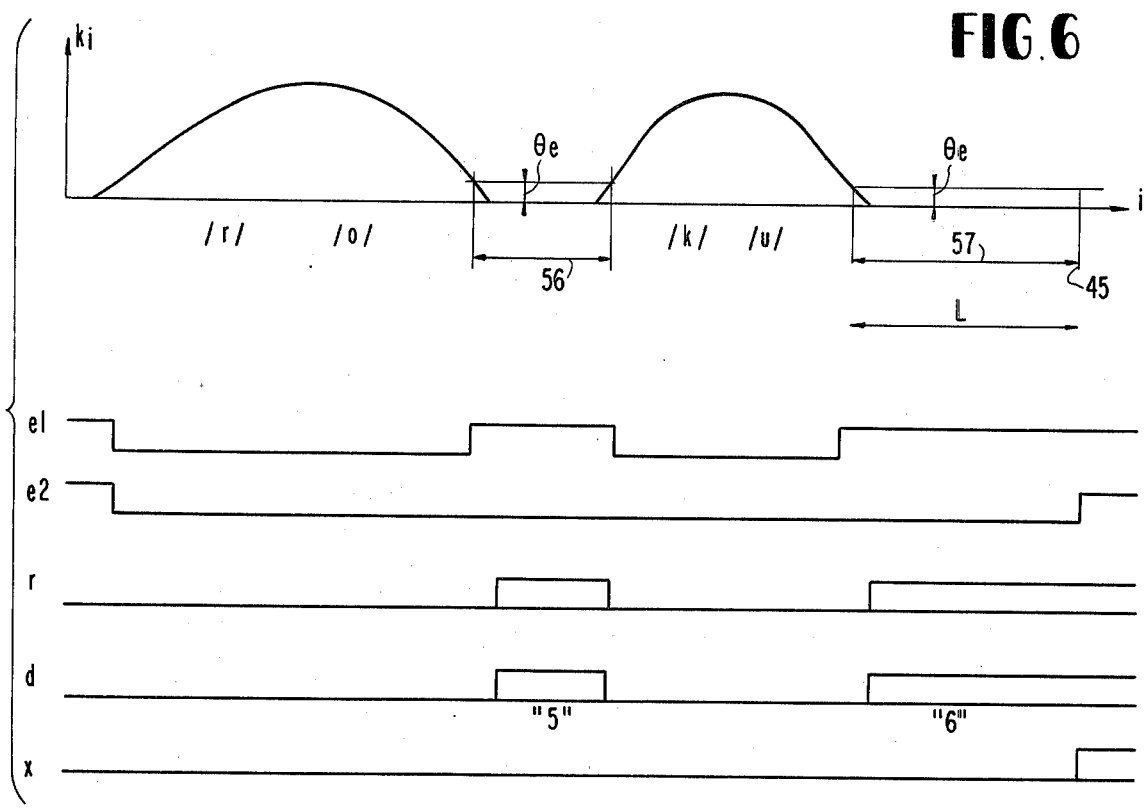
FIG. 6 is another detailed time chart of a few of the signals depicted in FIG. 3.

Referring now to FIG. 6, let it be presumed that a numeral "6" referred to in the preamble of the instant specification is supplied as an input voice pattern to a speech recognition system illustrated with reference to FIG. 1. During a pause interval in a word 56, the pause interval detection signal e1 takes the logic 1 value. Immediately after the beginning of the pause interval 56, the recognition unit 24 decides a result of recognition r. Inasmuch as an input pattern given by Equation (2) and supplied to the recognition unit 24 up to this instant corresponds only to /ro/, the recognition result r temporarily displayed by the display unit 53 may be an incorrect numeral "5" as discussed in the preamble and labelled along a wave form representative of the display signal d. It is to be noted, however, that the end detection signal e2 is kept in the meanwhile at the logic 0 value and consequently that the recognition result r is never delivered to the controlled device 52 no matter whether the result r is correct or incorrect. In the course of another pause interval 57 following the true end of the input voice pattern, the pause interval detection signal e1 again turns to the logic 1 value. The input pattern A supplied to the recognition unit 24 now corresponds to the numeral "6" as a whole. The display unit 51 will now display the correct numeral "6" as also labelled. When the end detection signal e2 turns to the logic 1 value at the above-mentioned instant 45, the correct result of recognition r is supplied to the controlled device 52 as a recognition output x of the speech recognition system. Although an incorrect recognition result might be displayed during the time in which an operator is pronouncing a word, the operator can neglect the incorrect display and continue the utterance because he knows that he has not yet finished the utterance.

It is now understood in conjunction with a speech recognition system illustrated with reference to FIG. 1 in general that an operator can know the result of recognition r by the display unit 53 at an instant 49 (FIG. 3) at which the recognition result r is at least temporarily decided by the recognition unit 24 although the result r is ultimately decided and transmitted to the controlled device 52 at a later instant 45 when it is found by the system that the input voice pattern has come to an end. A recognition unit 24 is already known which is capable of providing the result of recognition as soon as a pause interval 56 or 57 (FIG. 6) begins. By the lamp 55, the operator is informed of the fact that he is allowed to pronounce a next following word.

Figure 7:
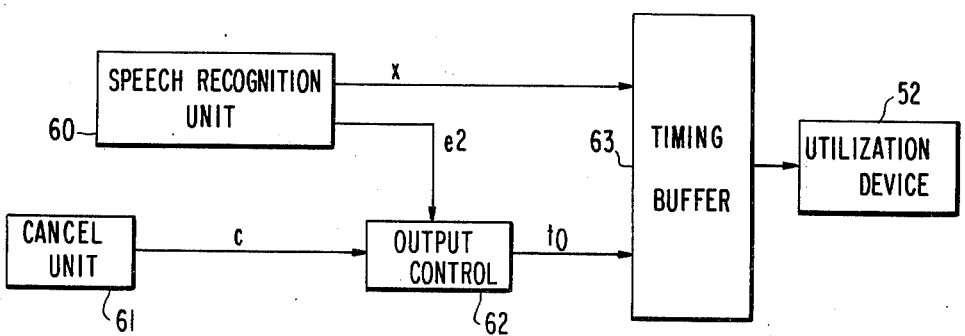
FIG. 7 is a block diagram of a speech recognition system according to a second embodiment of this invention.

Turning now to FIG. 7, a speech recognition system according to a second embodiment of this invention comprises a speech recognition unit 60, such as one that comprises the parts 20–24, 50–51, and 53–55 described in conjunction with a speech recognition system according to the above-illustrated first embodiment, for producing a recognition output x and an end detection signal e2 in response to a voice input, a cancel unit 61 for producing a cancel signal c if desired, an output control unit 62 responsive to the end detection signal e2 and the cancel signal c for producing an output timing signal $t_O$ only in the absence of the cancel signal c and with a delay, described later, after turning to the logic 1 value of the end detection signal e2, and a timing buffer 63 responsive to the output timing signal $t_O$ for supplying the recognition output x, temporarily stored therein, to the controlled or utilization device 52. When the controlled device 52 receives the recognition output x in synchronism with an energizing pulse, it is possible to use the output timing signal $t_O$ as the energizing pulse and to dispense with the timing buffer 63. The cancel unit 61 may be a circuit comprising a manually operable push-button switch (represented by the block 61 per se) for producing a pulse of the cancel signal c when the push-button switch is pressed down. It is to be pointed out that the above-mentioned predetermined period of about 250 milliseconds is generally insufficient for an operator, even though he may find by the display unit 51 that the result of recognition r is incorrect, to prevent the recognition output x from being supplied to the controlled device 52 automatically in response to the end detection signal e2. The delay, described more in detail in the following, should be sufficient for the operator, when the recognition result r is incorrect, to operate the push-button switch so as to prevent the output timing signal $t_O$ from making the controlled device 52 undesiredly receive the incorrect recognition output x.

Figure 8:
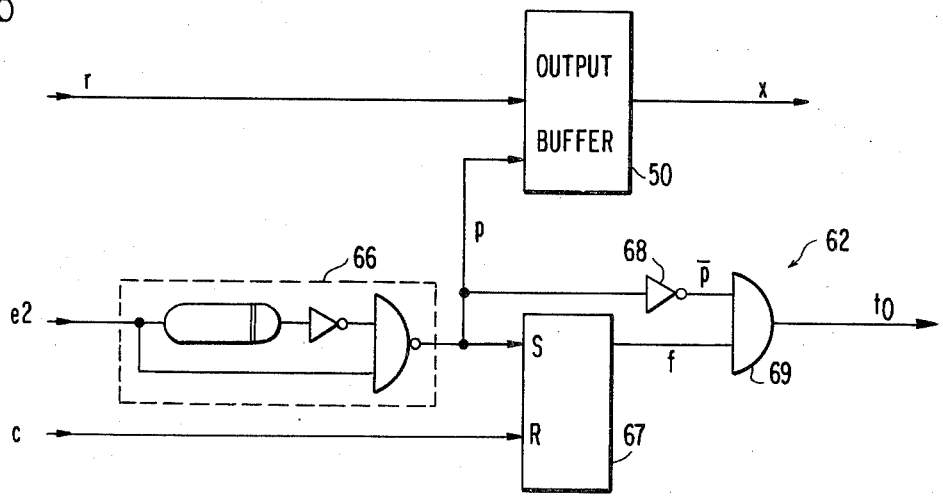
FIG. 8 is a block diagram of an output control unit used in a speech recognition system according to the second embodiment.
Figure 9:
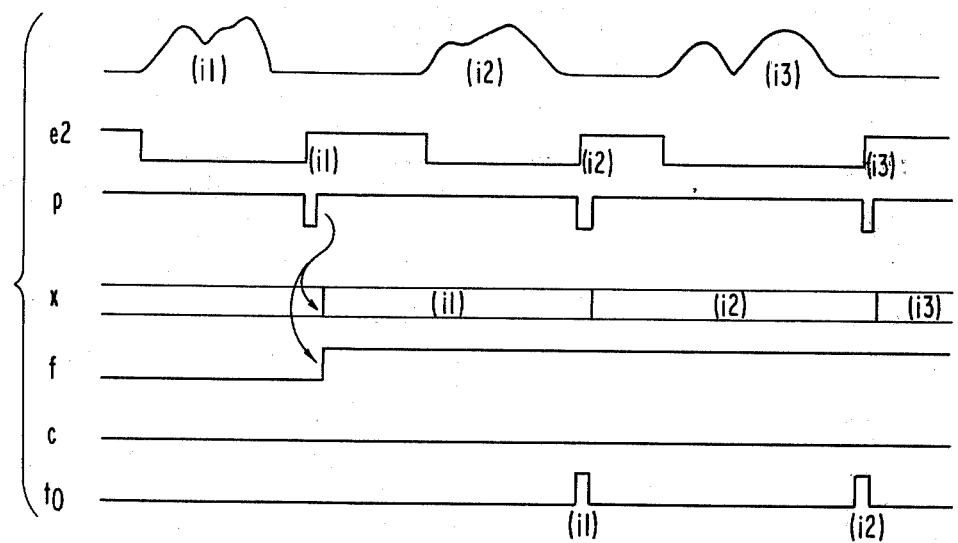
FIGS. 9(a) and 9(b) are time charts of several signals used in a speech recognition system comprising the output control unit depicted in FIG. 8, in the absence and presence, respectively, of a cancel pulse.
Figure 9:
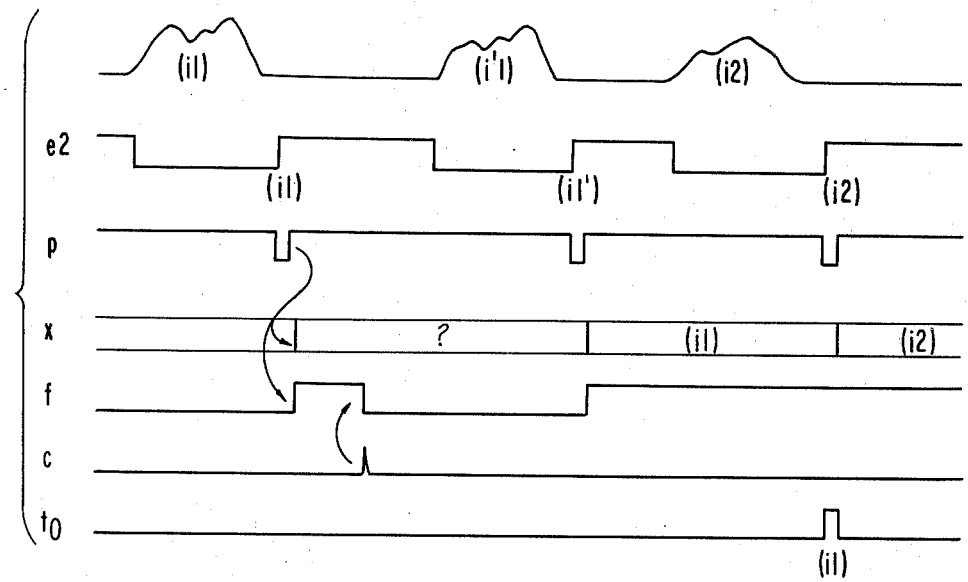

Referring to FIGS. 8, 9(a), and 9(b), an output control unit 62 for use in combination with the output buffer 50 in a speech recognition system according to the second embodiment comprises a differentiation circuit 66 for differentiating the end detection signal e2 to produce a negative-going pulse p each time when the signal e2 turns to the logic 1 value. The result of recognition r is written into the output buffer 50 in synchronism with the trailing edge (the instant of buildup) of the pulse p to produce the recognition output x. The output control unit 62 further comprises a flip-flop 67 reset by the cancel signal c and set by the trailing edge of the pulse p to render a set output f logic 1, an inverter 68 responsive to the negative-going pulse p for producing a positive-going end detection pulse $\bar{p}$, and an AND gate 69 enabled by the logic 1 set output f for allowing the end detection pulse $\bar{p}$ to pass therethrough to become a timing pulse of the output timing signal $t_O$. The logic 1 set output f thus serves as an enabling signal for the gate 69.

It is obvious from FIGS. 8 and 9(a) that successive recognition outputs $x(i_1)$, $x(i_2)$, $x(i_3)$, ... produced in response to first, second, third, and other voice inputs $i_1$, $i_2$, $i_3$, ... are supplied to the controlled device 52 in synchronism with those timing pulses $t_0(i_1)$, $t_0(i_2)$, ... of the output timing signal $t_0$ which are produced immediately following the instants at which end detection signals $e2(i_2)$, $e2(i_3)$, ... for the next following voice inputs $i_2$, $i_3$, ... turn to the logic 1 value so long as no cancel signal c is produced. Let it now be assumed as depicted in FIG. 9(b) that a recognition output x(?) for a first voice input $i_1$ is found to be incorrect. The operator presses the push-button switch of the cancel unit 61 down to produce a pulse of the cancel signal c and again supplies the first voice input to the speech recognition unit 60 as a once-again pronounced first voice input $i_1'$. When confirmed to be correct, the recognition output $x(i_1)$ for the latter voice input $i_1'$ is automatically supplied to the controlled device 52 in synchronism with a timing pulse $t_0(i_1)$ which is produced immediately following turning to the logic 1 value of an end detection signal $e2(i_2)$ representative of an end of a second voice input $i_2$ next following the once-again pronounced first voice input $i_1'$. With a speech recognition system comprising an output control unit 62 illustrated with reference to FIG. 8, it is now understood, for example, that the recognition output $x(i_1)$ for the first voice input $i_1$ is not received by the controlled device 52 unless that delay elapses after turning to the logic 1 value of the end detection signal $e2(i_1)$ for the first voice input $i_1$ which is determined by an interval between the turning to logic 1 value of the above-mentioned end detection signal $e2(i_1)$ and the trailing edge of the negative-going pulse p produced in response to the end detection signal $e2(i_2)$ for the next following second voice input $i_2$ supplied to the system after the result of recognition r represented by the first-mentioned recognition output $x(i_1)$ is confirmed to be correct. Within the delay, the operator can produce a pulse of the cancel signal c if he finds the recognition result r to be incorrect and repeat pronunciation of the incorrectly recognized voice input until he confirms the recognition result r to be correct. Although the recognition outputs x are received by the controlled device 52 with successive delays, no deterioration is thereby introduced into the speed of recognition of successive voice inputs.

Figure 10:
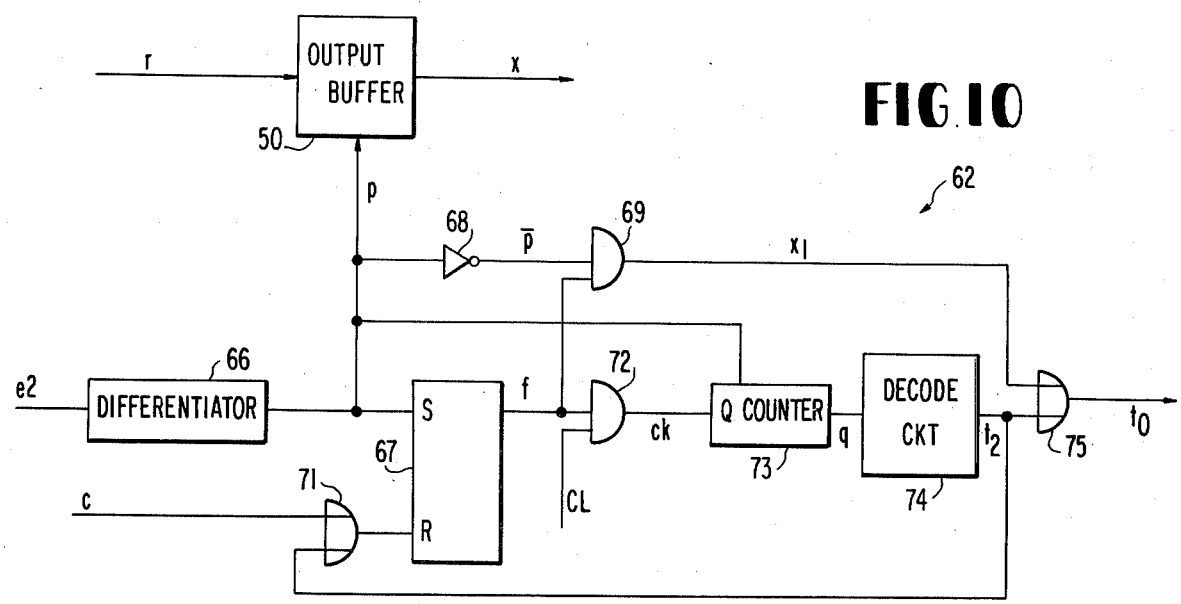
FIG. 10 is a block diagram of another output control unit used in a speech recognition system according to the second embodiment.
Figure 11:
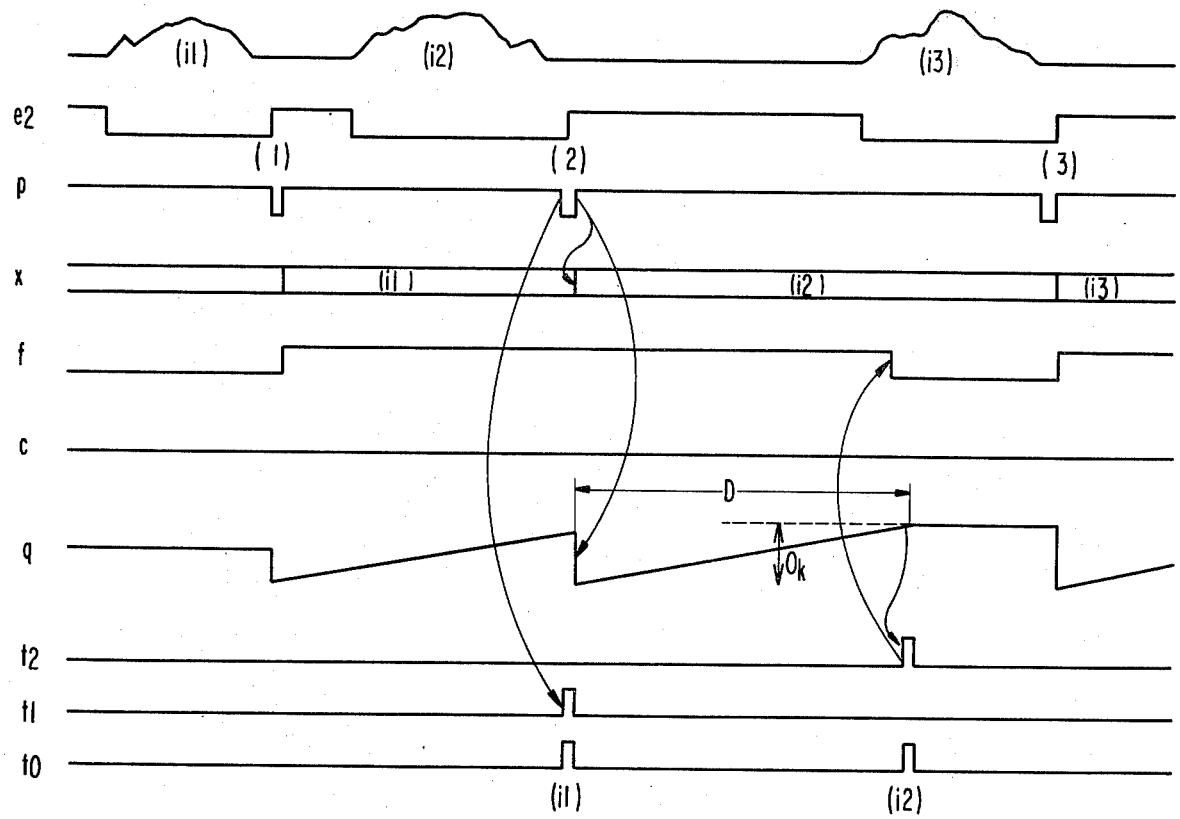
FIG. 11 is a time chart of several signals appearing in a speech recognition system comprising the output control unit shown in FIG. 10.

Referring to FIGS. 10 and 11, an output control unit 62 comprises similar parts 66, 67, 68, and 69 designated by like reference numerals as in the above-referenced FIG. 8 except that the timing pulses successively produced by the AND gate 69 are herein called a first timing signal $t_1$. The output control unit 62 further comprises an input OR gate 71 for supplying each pulse of the cancel signal c as a reset pulse to the flip-flop 67, an additional AND gate 72 enabled by the enabling signal f for allowing the frame frequency pulses CL to pass therethrough as clock pulses ck, a counter 73 reset by the negative-going pulses p for counting the clock pulses ck to produce a counter output q representative of that count of the clock pulses ck which is depicted in FIG. 11 in an analog fashion, and a decoder circuit 74 for decoding the counter output q and for comparing the decoded count with a predetermined threshold count $\theta_k$ to produce an output pulse as a second output timing signal $t_2$ each time when the count reaches the threshold count $\theta_k$. The threshold count $\theta_k$ corresponds to a predetermined delay or duration D that enables the operator to press the push-button switch of the cancel unit 61 down when the result of recognition of a voice input is found to be incorrect. It is possible by adjusting the circuit constants of the decoder circuit 74 to optionally change the threshold count $\theta_k$. Each output pulse of the second output timing signal $t_2$ is supplied to the flip-flop 67 as another reset pulse through the OR gate 71. The output control unit 62 still further comprises an output OR gate 75 for supplying the controlled unit 52 with that pulse of whichever of the first and second output timing signals $t_1$-$t_2$ which is produced after each instant of turning to the logic 1 value of the end detection signal e2.

Referring to FIG. 11 more in detail, let it be presumed that a first voice input $i_1$ is followed by a second voice input $i_2$ pronounced a little after an instant at which the result of recognition represented by a first recognition output $x(i_1)$ for the first voice input $i_1$ is confirmed to be correct immediately after turning to the logic 1 value of the pause interval detection signal e1 (not depicted in FIG. 11) and that a third voice input $i_3$ is supplied to the speech recognition system a long interval of time after confirmation to be correct of the result of recognition represented by a second recognition output $x(i_2)$ for some reason or another. The first recognition output $x(i_1)$ is received by the controlled device 52 in synchronism with a pulse $t_0(i_1)$ given by a timing pulse of the first output timing signal $t_1$ as described hereinabove with reference to FIG. 9(a). The second recognition output $x(i_2)$ is supplied to the controlled device 52 in synchronism with a pulse $t_0(i_2)$ resulting from an output pulse of the second output timing signal $t_2$ irrespective of presence and absence of the third voice input $i_3$.

Figure 12:
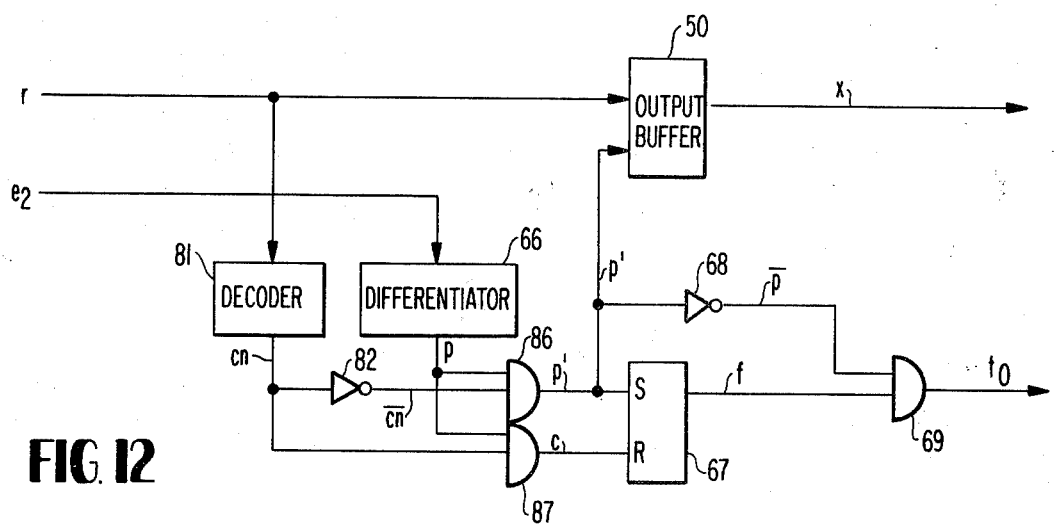
FIG. 12 shows in blocks still another output control unit and a cancel unit for use in a speech recognition system according to the second embodiment.

Referring finally to FIG. 12, an output control unit 62 comprises similar parts 66-69 designated by like reference numerals as in FIG. 8. It is to be noted, however, that this output control unit 62 further comprises a cancel code decoder 81 for decoding the successive results of recognition r to render a decoded output on logic 1 when the recognition result r represents a predetermined voice input of a cancel code, such as a word "cancel," and otherwise logic 0, another inverter 82 responsive to the decoded output cn for producing an inverted output c̄n̄ that becomes logic 1 only when the results of recognition r do not correspond to the cancel code, a first input AND gate 86 enabled by the logic 1 inverted output c̄n̄ for delivering the negative-going pulses p as set pulses p' to the flip-flop 67, and a second input AND gate 87 enabled by the decoded output cn for supplying as reset pulses the flip-flop 67 only with the negative-going pulses p produced for the predetermined voice inputs, namely, pulses of the cancel signal c. It is now understood that the set and reset pulses p and c correspond to the negative-going pulse p and a pulse of the cancel signal c illustrated with reference to FIGS. 9(a) and 9(b). With a speech recognition system comprising this output control unit 62, the operator is exempted from using his hand or foot in cancelling incorrect recognition results. It is possible to combine the output control unit for automatically providing the predetermined delay D with an output control unit 62 illustrated with reference to FIG. 12.

In connection with speech recognition systems according to the second embodiment so far described, it is now appreciated that the output buffer 50 is capable of being supplied with the output timing signal $t_O$ rather than with the negative-going pulses p with the timing buffer 63 dispensed with. The preselected interval of time after which the output timing signal $t_O$ follows turning to the logic 1 value of a pause interval detection signal e1 is equal to a sum of the predetermined period of about 250 milliseconds plus either the predetermined delay D or the interval between those instants at which the predetermined period of time has just elapsed after turning to the logic 1 value of a pause interval detection signal e1 for a voice input and after turning to the logic 1 value of another pause interval detection signal e1 for a next following voice input with these pause interval detection signals e1 kept at the logic 1 value.

While two preferred embodiments of this invention have thus far been described together with several examples of the constituent parts, it should clearly be understood that other embodiments and modifications are possible within the scope of this invention. For example, it is possible to make the end detector 23 detect a pause interval in general and an end interval as a result of combined judgement for the amplitude level and the number of zero crossings of the voice input in consideration of the fact that the latter number is small in a pause interval. It is also possible to deal directly with the analog amplitude level k rather than with the digital amplitude levels $k_i$. As mentioned in conjunction with the output control unit 62 illustrated in FIG. 8, the end detection signal e2 may be produced by the end detector 23 as a pulse. This applies to the pause interval detection signal e1. The display unit 53 may provide the "display" by sound or otherwise provided that the "display" is clearly perceptible. The lamp 55 may be replaced by any other optimal indicator.

What is claimed is:

1. In a speech recognition system of the type including recognition means responsive to a voice input and a conditioning input for recognizing said voice input to produce a recognition output representative of a result of recognition, said voice input including at least one brief pause interval and an end interval, said end interval defining the end of said voice input, wherein the improvement comprises beginning detection means responsive to said voice input for producing a start pulse representative of the beginning of said voice input, end detection means responsive to said voice input for producing a pause interval detection signal representative of at least one of said pause interval and said end interval and an end detection signal representative of said end interval, means for supplying said start pulse and said pause interval detection signal to said recognition means as said conditioning input, display means responsive to said pause interval detection signal and said recognition output for displaying said results of recognition, and output means responsive to said end detection signal for supplying said recognition output to a utilization device.

2. In a speech recognition system of the type including recognition means responsive to an input electrical signal representative of a voice input and a conditioning input for recognizing said voice input to produce a recognition output representative of a result of recognition, said voice input including at least one brief pause interval and an end interval, said end interval defining the end of said voice input, wherein the improvement comprises beginning detection means responsive to said input electrical signal for producing a start pulse representative of the beginning of said voice input, pause interval detection means responsive to said input electrical signal and a predetermined threshold level for producing a pause interval detection signal representative of at least one of said pause interval and said end interval whenever the level of said input electrical signal is not higher than said threshold level, means for supplying said start pulse and said pause interval detection signal to said recognition means as said conditioning input, display means responsive to said pause interval detection signal and said recognition output for displaying said result of recognition, output control means responsive to said pause interval detection signal for producing an output timing signal only when said pause interval detection signal lasts at least a preselected interval of time, and output means responsive to said output timing signal for supplying said recognition output to a utilization device.

3. A speech recognition system as claimed in claim 2 wherein said output control means comprises means responsive to said pause interval detection signal and a predetermined period of the order of 250 milliseconds serving as said preselected interval of time for producing a portion of said pause interval detection signal as said output timing signal only when said pause interval detection signal lasts at least said predetermined period.

4. A speech recognition system as claimed in claim 2 wherein said output control means comprises first means responsive to said pause interval detection signal and a predetermined period of the order of 250 milliseconds for producing an end detection pulse only when said pause interval detection signal lasts at least said predetermined period, second means for producing, when put into operation, a cancel pulse, two-state means put by a pulse of a first signal into a first state for producing an enabling signal and by a pulse of a second signal into a second state for not producing said enabling signal, third means for supplying said end detection pulse to said two-state means as a pulse of said first signal, fourth means for supplying said cancel pulse to said two-state means as a pulse of said second signal, logic means responsive to said enabling signal and the end detection pulse produced for a next following voice input for making the last-mentioned end detection pulse serve as a timing pulse only in the presence of said enabling signal, and fifth means for supplying said timing pulse to said output means as said output timing signal, whereby said preselected interval of time is rendered equal to said predetermined period plus an interval between those instants at which the first-mentioned and the last-mentioned end detection pulses are produced, respectively.

5. A speech recognition system as claimed in claim 4 wherein said output control means further comprises sixth means responsive to said enabling signal and a predetermined delay for producing an output pulse only when said enabling signal lasts at least said predetermined delay, said fourth means comprising means for supplying said output pulse to said two-state means as another pulse of said second signal, said fifth means comprising means for supplying said output pulse to said output means also as said output timing signal, whereby said preselected interval of time is rendered equal to said predetermined period plus said interval when said timing pulse is produced and equal to said predetermined period plus said predetermined delay when said output pulse is produced.

6. A speech recognition system as claimed in claim 5 wherein said second means comprises a manually operable switch that produces said cancel pulse when put into operation.

7. A speech recognition system as claimed in claim 5 wherein said second means comprises decoder means responsive to the recognition output produced for a predetermined voice input for producing said cancel pulse.

8. A speech recognition system as claimed in claim 7 wherein said decoder means comprises a decoder responsive to the recognition output produced for said predetermined voice input for producing a decoded output and a gate responsive to said decoded output and the end detection pulses produced for successive voice inputs for allowing only the end detection pulse produced for said predetermined voice input to pass therethrough to become said cancel pulse, said third means comprising another gate responsive to said decoded output and the end detection pulses produced for said successive voice inputs for supplying only the end detection pulses produced for the voice inputs other than said predetermined voice input to said two-state means as the pulses of said first signal.

* * * * *

UNITED STATES PATENT AND TRADEMARK OFFICE
CERTIFICATE OF CORRECTION

PATENT NO. : 4,158,750

DATED : June 19, 1979

INVENTOR(S) : Hiroaki SAKOE et al

It is certified that error appears in the above-identified patent and that said Letters Patent are hereby corrected as shown below:

Column 2, line 8 - after "word" delete "of" (first occurrence) and insert --or--.

Column 3, line 5 - after "below" delete "supplying"

Signed and Sealed this

Sixth Day of November 1979

[SEAL]

Attest:

RUTH C. MASON
*Attesting Officer*

LUTRELLE F. PARKER
*Acting Commissioner of Patents and Trademarks*